US012162652B2

(12) United States Patent
Castaing

(10) Patent No.: US 12,162,652 B2
(45) Date of Patent: Dec. 10, 2024

(54) SAFETY OUTER CAP FOR A CONTAINER

(71) Applicant: Ceva Santé Animale, Libourne (FR)

(72) Inventor: Jean-Francois Castaing, Libourne (FR)

(73) Assignee: CEVA SANTE ANIMALE, Libourne (FR)

( * ) Notice: Subject to any disclaimer, the term of this patent is extended or adjusted under 35 U.S.C. 154(b) by 114 days.

(21) Appl. No.: 17/773,432

(22) PCT Filed: Oct. 27, 2020

(86) PCT No.: PCT/EP2020/080182
§ 371 (c)(1),
(2) Date: Apr. 29, 2022

(87) PCT Pub. No.: WO2021/083895
PCT Pub. Date: May 6, 2021

(65) Prior Publication Data

US 2022/0363450 A1 Nov. 17, 2022

(30) Foreign Application Priority Data

Oct. 29, 2019 (EP) .................................... 19306405

(51) Int. Cl.
*B65D 47/08* (2006.01)
*A61J 1/14* (2023.01)
(Continued)

(52) U.S. Cl.
CPC ........ *B65D 47/0838* (2013.01); *A61J 1/1406* (2013.01); *A61J 1/1418* (2015.05); *B65D 51/002* (2013.01); *B65D 51/30* (2013.01)

(58) Field of Classification Search
CPC .. B65D 47/0838; B65D 51/002; B65D 51/30; B65D 2401/25; A61J 1/1406; A61J 1/1418
See application file for complete search history.

(56) References Cited

U.S. PATENT DOCUMENTS

| | | | | |
|---|---|---|---|---|
| 5,088,612 A * | 2/1992 | Storar | .................. | B65D 51/002 215/237 |
| 5,782,383 A * | 7/1998 | Robinson | .............. | A61J 1/1406 215/250 |

(Continued)

*Primary Examiner* — James N Smalley
(74) *Attorney, Agent, or Firm* — Wood, Phillips, Katz, Clark & Mortimer

(57) ABSTRACT

The present invention relates to an outer cap device for a container having a neck, the opening of which is closed off by a closure device comprising a region (13) to be safeguarded. According to the invention, this outer cap device comprises: —a main body (14) intended to be fastened to the neck of the container, this main body (14) comprising an upper wall (18) having an opening intended to be positioned next to this region (13) to be safeguarded when the main body (14) is fastened to the neck of this container so as to leave said region (13) to be safeguarded freely accessible, —a cover (16) comprising an internal face (22) and an inner skirt (23) extending from this internal face (22), the internal face (22) being closed in line with this inner skirt (23), this inner skirt (23) being designed to pass through the opening in the upper wall (18) of the main body (14) and surround the region (13) to be safeguarded when the cover (16) is in the closed position, —holding means for locking the cover (16) in the closed position and allowing it to be unlocked to pass into the open position, these holding means being configured to press the free end of the inner skirt (23) against the closure device in the closed position of the cover (16) so as to form a sealed barrier surrounding the region (13) to be safeguarded, in order to limit exchanges from this region (13) to be safeguarded with the single interior volume of the inner skirt (23).

9 Claims, 3 Drawing Sheets

(51) Int. Cl.
*B65D 51/00* (2006.01)
*B65D 51/30* (2006.01)

(56) References Cited

U.S. PATENT DOCUMENTS

| | | | | |
|---|---|---|---|---|
| 5,810,792 | A * | 9/1998 | Fangrow, Jr. | A61M 39/045 604/533 |
| 7,946,437 | B2 * | 5/2011 | Thilly | B65D 23/001 215/249 |
| 9,339,438 | B2 * | 5/2016 | Lev | A61J 1/2051 |
| 9,884,706 | B1 * | 2/2018 | Skillin | B65D 41/34 |
| 2009/0306620 | A1 * | 12/2009 | Thilly | B65D 51/002 29/428 |

* cited by examiner

[Fig. 1]
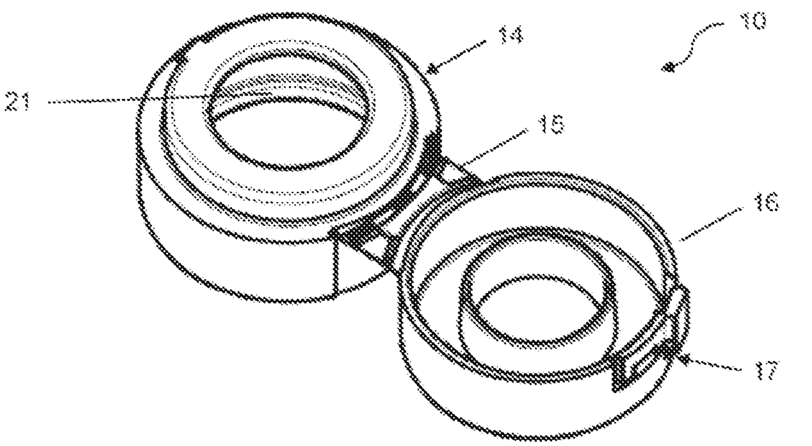
[Fig. 2]
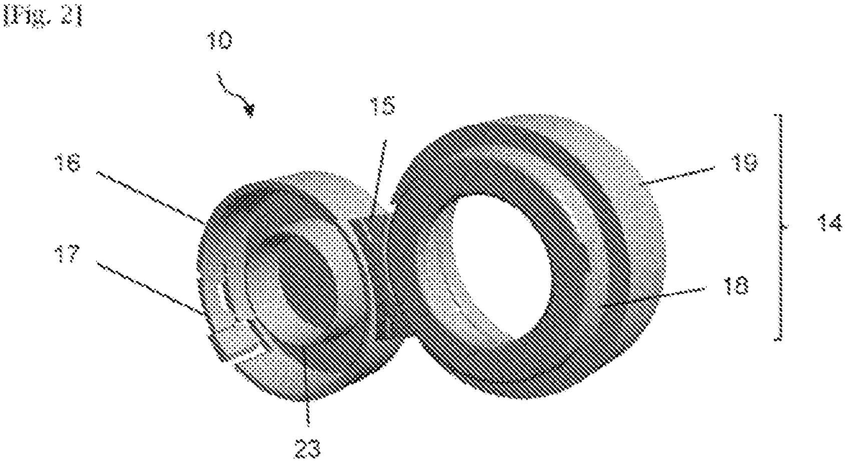
[Fig. 3]
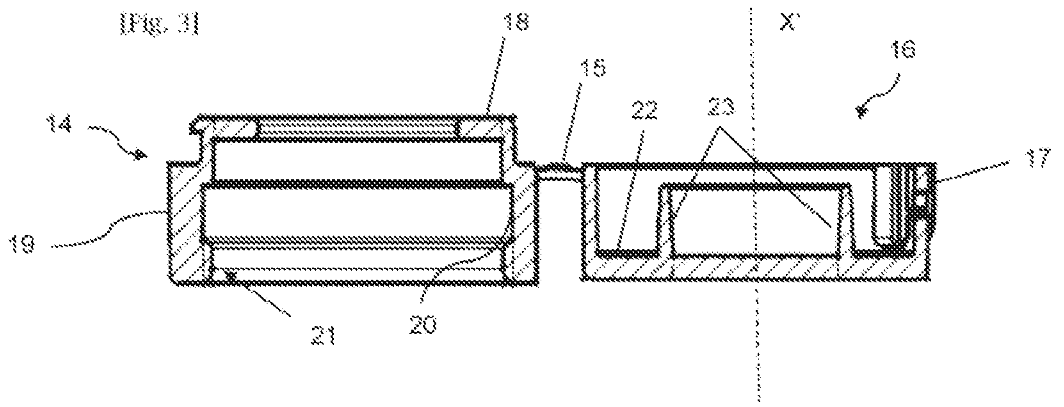

[Fig. 4]
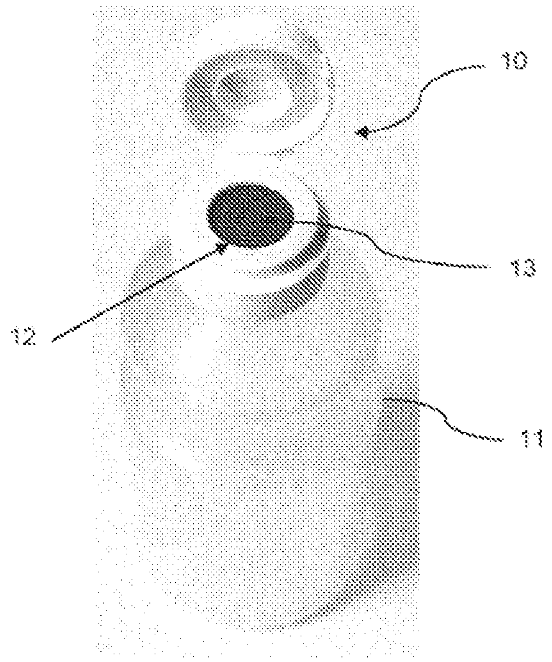
[Fig. 5]
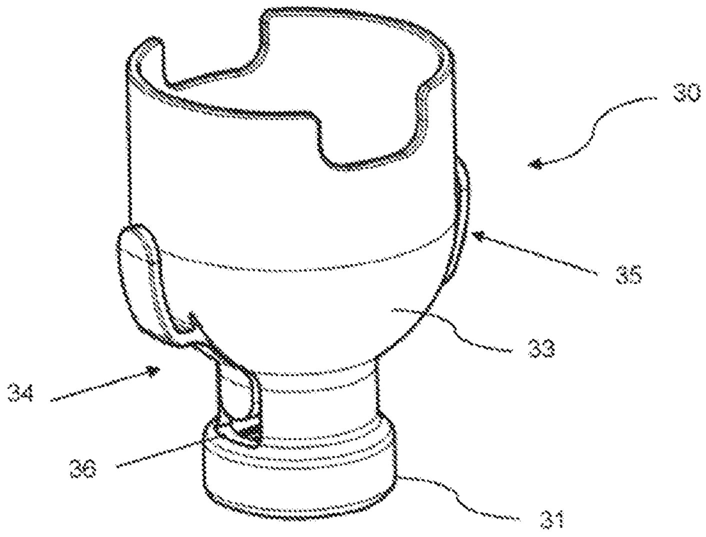

[Fig. 6]
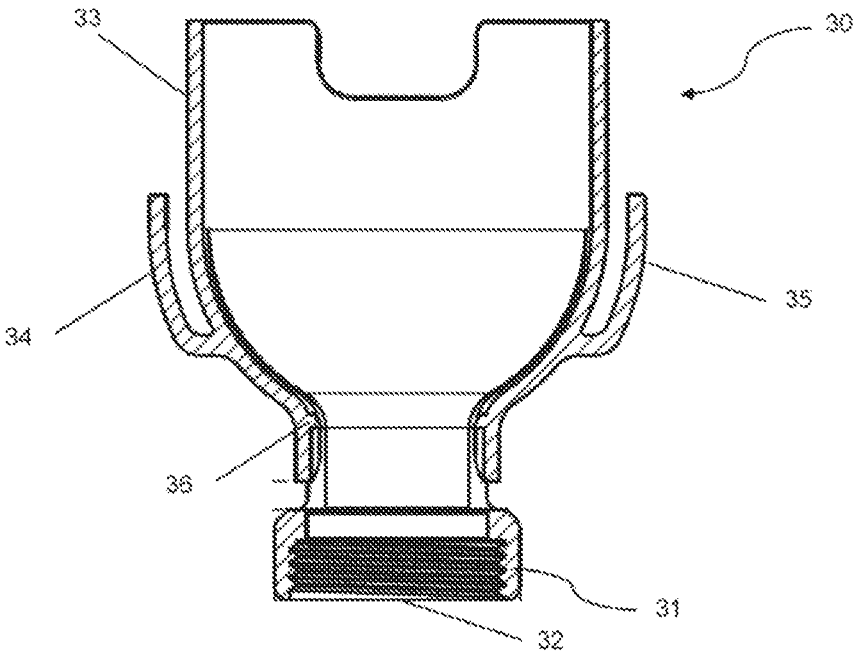

SAFETY OUTER CAP FOR A CONTAINER

TECHNICAL FIELD

The present invention relates to a safety outer cap for covering the neck of a container already equipped with a closure device closing its opening.

It further relates to a container equipped with a safety outer cap of this type.

STATE OF THE ART

It is known to administer treatments (curative, preventive, nutritional, etc.) to farm animals, in particular drugs aimed at preventing a large number of diseases that may otherwise prove highly debilitating or even fatal.

However, for the safety and efficacy of such drugs to be optimal, it is essential that they be administered and stored under appropriate conditions.

It is thus recommended to use single-use syringes, the injection needles of these syringes having to be systematically disinfected.

However, as the size of farms increases, in particular with the development of intensive farming, injection guns are also known for carrying out these batch treatments on live animals in a minimum amount of time.

In this case too, during each injection, the injection needle of the gun has to be disinfected.

Medication packaging devices are generally glass vials allowing the storage of these medications in spaces that are refrigerated and protected from light.

For practical and economic reasons, these vials contain a large number of doses of active product, in particular when they are intended to be used with injection guns.

To keep the contents of the vial aseptic, a self-sealing closure element generally closes the opening of the neck of the vial to maintain the tightness of the vial after removal of the injection needle.

Specifically, a self-sealing closure element of this type, also known as a self-sealing gasket, makes it possible to close automatically the orifice left by the withdrawal of an injection needle.

A metal top crimped onto the neck of the vial completes this closure element by covering its peripheral edge to hold it in place.

This top may also receive a sealing veil to protect the closure element before the vial is used for the first time.

This assembly consisting of the metal top and the self-sealing closure element thus defines a needle penetration region, into which the operator can introduce an injection needle or trocar to access the contents of the vial so as to withdraw some or all of its content.

Although it gives good results, it is nonetheless noted that this assembly for sealing a vial can be improved.

Indeed, it is noted that the repeated introduction of a piercing element such as a needle or trocar into a self-sealing closure element leads to a deterioration in its ability to reseal reliably an orifice caused by the removal of a needle.

It is thus found that the tightness necessary for the preservation of the injectable composition contained in the corresponding vial is no longer ensured after a certain number of withdrawals.

The efficacy, or even the safety, of this injectable composition may therefore be affected, in particular if this vial is stored again with a view to subsequent injection, the entirety of its contents not having been used during a first treatment operation on a batch of animals.

However, compliance with animal welfare standards is a major concern nowadays.

There is therefore a pressing need for an outer cap device for a container, the original design of which makes it possible to overcome the drawbacks of the state of the art that are set out above.

SUBJECT MATTER OF THE INVENTION

The present invention thus aims to overcome the drawbacks of the state of the art by proposing an outer cap device that is simple in its design and in its mode of operation and that makes it possible to improve the safety of a faulty cap or of a cap whose ability to seal an opening is likely to deteriorate over time or as a result of the conditions of its use.

A further subject matter of the present invention is an economical and particularly reliable outer cap device of this type.

The present invention also relates to a container equipped with an outer cap device of this type.

The present invention further relates to an adapter assembly on an injection gun comprising a container of this type, this assembly being particularly easy to implement and reliable.

DISCLOSURE OF THE INVENTION

For this purpose, the invention relates to an outer cap device for a container comprising a neck, the opening of which is closed off by a closure device comprising a region to be safeguarded.

According to the invention, this outer cap device comprises:

- a main body intended to be fastened to the neck of the container, this main body comprising an upper wall having an opening intended to be positioned next to this region to be safeguarded when the main body is fastened to the neck of this container so as to leave said region to be safeguarded freely accessible,
- a cover comprising an internal face and an inner skirt extending from this internal face, the internal face being closed in line with this inner skirt, this inner skirt being designed to pass through the opening in the upper wall of the main body and surround the region to be safeguarded when the cover is in the closed position,
- holding means for locking the cover in the closed position and allowing it to be unlocked to pass into the open position, these holding means being configured to press the free end of the inner skirt against the closure device in the closed position of the cover so as to form a sealed barrier surrounding the region to be safeguarded, in order to limit exchanges from this region to be safeguarded with the single interior volume of the inner skirt.

This outer cap device is preferably implemented to complete and safeguard the capping of a container. Of course, it could also replace a cap for sealing the neck opening of a container on its own.

Thus, this outer cap device is preferably used with a cap intended to seal the opening of the neck of a container. This cap defines a region to be safeguarded that is capable of giving access to the contents of the container. This region to be safeguarded may be defined upstream by the user, as a preventive measure, or may exist for example because it results from premature aging of a cap or from an abandoned attempt to open a cap that leaves an unclosed orifice, or, in the particular case of a self-sealing closure element, may be a predefined penetration region of a piercing element, such as an injection needle or trocar, or even of a tubular element, such as a pipe, which is to be reinforced to protect the contents of the container equipped therewith.

"The internal face of the cover being closed in line with this inner skirt" means that at least this part of the internal face of the cover, which forms a base of the inner skirt, is solid or not open so as to ensure the tightness of the interior volume delimited by the inner skirt and this base.

Advantageously, this main body is cylindrical. The cover may be completely solid.

In a particular embodiment of this outer cap device, this cover is connected to the main body by one or more hinges so as to be articulated around an axis.

Preferably, in this case this outer cap device is in one piece and made of plastics material, for example.

For purely illustrative purposes, it is made of polyethylene (PE), polypropylene (PP), polyvinylchloride (pvc), polycarbonate (PC), or any other suitable plastics material.

In another embodiment of this outer cap device, while the cover is made of a material more rigid than the material forming the closure device, this inner skirt has a longitudinal axis and a longitudinal dimension that ensure compression of the closure device by the free end of the inner skirt, in the closed position of the cover, to create said sealed barrier.

Alternatively, the inner skirt of the cover comprises, at its free end, a sealing device configured to be crushed when it is pressed against the closure device in order to ensure tightness between this inner skirt and this closure device and able to return to its original shape, or substantially its original shape, when the cover is in the open position.

This sealing device may be an annular sealing element comprising a membrane inside which a gel or a fluid such as an inert gas is placed.

In yet another embodiment of this outer cap device, the interior volume of the skirt defines a housing receiving a support soaked in at least one antiseptic agent, an air filtration element, a desiccant, an RFID tag or a combination of these elements.

In yet another embodiment of this outer cap device, the main body comprises an inner wall extending from the upper wall and an annular retaining projection extending radially from this inner wall, which is intended to snap onto the neck of the container.

In this case, the neck of this container comprises an annular groove to receive this annular projection.

Alternatively, the neck of the container may comprise an external thread, in which case the main body comprises an internal wall extending from the upper wall, this internal wall comprising an internal thread for screwing the main body onto this external thread of the neck of the container.

In yet another embodiment of this outer cap device, it comprises a tear-off strip for locking the cover on the main body in the closed position, this tear-off strip being connected to the main body and/or to the cover by a line of least mechanical resistance so as to ensure the release of the cover during the first use.

According to yet another embodiment of this outer cap device, the holding means comprise members for clipping the cover onto the main body of the cap, which are arranged so as to ensure pressing of the free end of the inner skirt of the cover against the closure device in the closed position of this cover.

The present invention also relates to a container comprising a neck. According to the invention, this neck is capped with an outer cap device as described previously.

This container may be a flask, a vial, a bottle, a jar, a can or even a barrel.

Preferably, this container is made of plastics material, but it could be made of glass.

Advantageously, while the neck of this container comprises an opening closed by a closure device having a region to be safeguarded, this closure device is a self-sealing gasket comprising a penetration region for a piercing element.

This penetration region therefore forms the region of the closing element to be safeguarded. It is advantageously marked to facilitate the introduction of a piercing element such as a needle or a tube.

Purely by way of illustration, this penetration region may be spatially delimited on the closure element by a lip forming a projection from the rest of the external surface of the closure element, this lip being for example annular.

The container may include an element for indicating the temperature of its contents, such as a label with thermochromic ink or a thermochromatic dye included in the mass of the outer cap device.

The present invention also relates to the use of the outer cap device, as described above, for capping a container.

This outer cap device may advantageously be implemented alone to plug the orifice of the neck of a container and ensure the necessary tightness.

Preferably, however, it is implemented to complete a cap already closing the opening of the neck of the container.

The present invention further relates to an assembly comprising a vial as described previously and a vial adapter comprising a connection interface, an opening for accessing the contents of the vial and a body part for receiving and supporting the upper part of the vial.

According to the invention, this body part comprises at least one folding tab formed in one piece with this body part, said at least one folding tab comprising a so-called proximal end that is movable between at least a rest position and a release position achieved by folding or pivoting the tab about an axis, said at least one tab being intended to return to its initial position when released, the proximal end of said at least one tab comprising a blocking member to come to rest behind the main body of the outer cap device in the rest position of this tab so as to block this vial in position.

Preferably, the connection interface is configured to be assembled with a connector of an injection gun.

Advantageously, this body part of the adapter has a flared shape whose upper end, of cylindrical shape, has a diameter equal or substantially equal to the diameter of the body of the vial so as to limit the lateral displacement of the vial with respect to the body part of the adapter.

BRIEF DESCRIPTION OF THE DRAWINGS

Other advantages, aims and particular features of the present invention will emerge from the following description, given for explanatory purposes and in a non-limiting manner with reference to the appended drawings, in which:

FIG. 1 is a perspective view from above of an outer cap device according to a particular embodiment of the present invention;

FIG. 2 is another perspective view of the outer cap device of FIG. 1;

FIG. 3 is a schematic sectional drawing of the outer cap device of FIG. 1;

FIG. 4 is a perspective view of a vial equipped with a self-sealing cap and with an outer cap device as shown in FIG. 1, which are assembled;

FIG. 5 is a schematic perspective drawing of an injection gun adapter according to one embodiment of the invention;

FIG. 6 is a sectional front view of the adapter of FIG. 5.

DESCRIPTION OF EMBODIMENTS

The drawings and the following description essentially include elements of a particular nature. They may therefore not only serve to convey a better understanding the present invention, but also contribute to defining it, as applicable.

First, it is noted that the drawings are not to scale.

FIGS. 1 to 4 schematically illustrate an outer cap device according to a particular embodiment of the present invention.

As is shown in FIG. 4, this outer cap device 10 is implemented here to safeguard the contents of a vial 11 comprising a neck whose opening is closed by a self-sealing cap 12. This vial 11 is made of plastics material, but could be made of glass.

In a known manner, this self-sealing cap 12 comprises a penetration region 13 for introducing a needle or trocar (not shown).

Here, this outer cap device 10 therefore aims to safeguard this penetration region 13 so as to protect the contents of the vial 11 in the event of failure of the self-sealing cap 12.

This outer cap device 10 is made of a single piece of plastics material, here polypropylene, and has a thickness ensuring its rigidity and its rigid connection to the vial.

It comprises a main body 14 of cylindrical shape, to which a cover 16 is connected by a hinge 15. This cover 16 is therefore articulated about an axis of rotation between a closed position and an open position. In FIGS. 1 to 4, it is shown in the open position.

To preserve the integrity of the contents of the vial 11 and of the self-sealing cap 12 until the use of the vial 11, a tear-off strip 17 connects the main body 14 to the cover 16 in the closed position. The operator only has to tear off this strip 17 to release the cover 16 so that it can be placed in the open position.

This main body 14 comprises an upper wall 18, open at its center, and a first skirt 19 of cylindrical shape extending from this upper wall 18. The inner wall 20 of this skirt, which has a substantially smooth surface, has at its lower end a retaining projection 21 extending radially from the inner wall of this first skirt 19. This retaining projection 21 is intended to cooperate with the neck of the vial 11 to secure the outer cap device 10 to the neck of the vial 11 by snap-fastening. This main body 14 is therefore forced down over the neck of the vial to assemble it.

As is illustrated in FIG. 4, the upper wall 18 of the main body has an opening which is placed opposite the penetration region 13 to be safeguarded when the main body 14 is fixed on the neck of the vial 11 This opening therefore gives free access to this penetration region 13 to allow passage of the body of the needle or trocar.

The upper wall 18 thus forms a hollow annular wall in its center, which overlaps the peripheral edge of the self-sealing cap 12 to ensure that it is held in position on the neck of the vial 11.

The cover 16, which is solid, comprises an internal face 22 and an inner skirt 23 of cylindrical shape extending from this internal face 22.

This inner skirt 23, which has a longitudinal axis XX', has a diameter smaller than the diameter of the opening in the upper wall 18 of the main body so as to pass through this opening when the cover 16 is moved from its open position towards its closed position. The diameter of this inner skirt 23 is, however, greater than or equal to the diameter of the penetration region 13, so that the free end of this skirt surrounds this penetration region 13 when the cover 12 is in the closed position.

Means for holding the cover 16 in the closed position are arranged to ensure that the free end of the inner skirt 23 is laid against the outer surface of the self-sealing cap 12 in the closed position of the cover 16.

As this self-sealing cap is made of a malleable material, the free end of the inner skirt 23 compresses the surface of this self-sealing cap 12 in the closed position of the cover to form a sealed barrier surrounding the penetration region 13. This penetration region 13 can therefore only exhibit exchanges with the interior volume of the interior skirt 23. If this penetration region 13 fails, it is thus advantageously ensured that the contents of the vial 11 cannot be contaminated by external elements when the cover 16 is in the closed position.

FIGS. 5 and 6 schematically show an adapter 30 for an injection gun according to an embodiment of the invention.

An adapter 30 of this type makes it possible to connect a vial 11 and its outer cap device 10, as shown in FIG. 4, onto an injection gun (not shown).

The lower part of this adapter 30 also comprises a connection interface 31, here a thread, allowing it to be screwed onto a receiving thread placed on the body of the gun so as to ensure assembly of the adapter 30 on the body of the gun.

The lower end of this adapter 30 also has an opening 32 to allow the passage of a trocar mounted on the body of the injection gun in order to access the contents of the vial 11.

The adapter 30 also includes a body part 33 extending from the connection interface 31 towards its upper end to receive and support the upper part of the vial 11.

This body part 33 comprises a flared part, of which the widest, upper portion is extended by a cylindrical portion to accommodate the main body of the vial, the lower portion has a narrowing to accommodate the neck of the bottle, and a portion shoulder joins the upper portion and the lower portion.

This body part 33 here comprises two folding tabs 34, 35 formed in one piece with the body part.

Each folding tab 34, 35 comprises a proximal end 36 movable between at least a rest position and a release position, reached by bending or pivoting of the tab about an axis.

Each folding tab 34, 35 is intended to return to its initial position when it is released, the proximal end 36 of each tab 34, 35 comprising a blocking member to come to rest behind the main body of the outer cap device 10 in the rest position of this tab so as to block the vial in position.

What is claimed is:

1. An outer cap device for a container having a neck, the opening of which is closed off by a closure device comprising a region to be safeguarded (13), characterized in that the outer cap device comprises:

- a main body (14) intended to be fastened to the neck of the container, the main body (14) comprising an upper wall (18) having an opening intended to be positioned next to the region (13) to be safeguarded when the main body (14) is fastened to the neck of the container so as to leave said region (13) to be safeguarded freely accessible,
- a cover (16) comprising an internal face (22) and an inner skirt (23) extending from the internal face (22), the internal face (22) being closed in line with the inner skirt (23), the inner skirt (23) being designed to pass through the opening in the upper wall (18) of the main body (14) and surround the region (13) to be safeguarded when the cover (16) is in the closed position, holding means for locking the cover (16) in the closed position and allowing it to be unlocked to pass into the open position, these holding means being configured to press the free end of the inner skirt (23) against the closure device in the closed position of the cover (16) so as to form a sealed barrier surrounding the region (13) to be safeguarded, in order to limit exchanges from the region (13) to be safeguarded with the single interior volume of the inner skirt (23), characterized in that the inner skirt (23) of the cover (16) comprises, at its free end, a sealing device configured to be crushed when it is pressed against said closure device in order to ensure tightness between the inner skirt (23) and the closure device and able to return to its original shape, or substantially its original shape, when the cover (16) is in the open position.

2. Outer cap device according to claim 1, characterized in that the cover (16) is connected to the main body (14) by one or more hinges (15) so as to be articulated around an axis.

3. Outer cap device according to claim 1, characterized in that, while the cover (16) is made of a material more rigid than the material forming the closure device, the inner skirt (23) has a longitudinal axis and a longitudinal dimension that ensure compression of the closure device by the free end of the inner skirt (23), in the closed position of the cover (16), to create said sealed barrier.

4. Outer cap device according to claim 1, characterized in that the interior volume of the skirt (23) defines a housing receiving a support soaked in at least one antiseptic agent, an air filtration element, a desiccant, an RFID tag or a combination of these elements.

5. Outer cap device according to claim 1, characterized in that the main body (14) comprises an inner wall (20) extending from the upper wall (18) and in that an annular retaining projection (21) extends radially from the inner wall (20).

6. Outer cap device according to claim 1, characterized in that, while the neck of the container comprises an external thread, the main body (14) comprises an internal wall (20) extending from the upper wall (18), the internal wall comprising an internal thread for screwing the main body (14) onto the external thread of the neck of the container.

7. Outer cap device according to claim 1, characterized in that the outer cap device comprises a tear-off strip (17) for locking the cover (16) on the main body (14) in the closed position, the tear-off strip (17) being connected to the main body (14) and/or to the cover (16) by a line of least mechanical resistance so as to ensure the release of the cover (16).

8. Outer cap device according to claim 1, characterized in that said holding means comprise members for clipping the cover (16) onto the main body (14) of the cap, which are arranged to ensure pressing of the free end of the inner skirt (23) against the closure device in the closed position of the cover (16).

9. A method of using the outer cap device according to claim 1 for capping a container.

* * * * *